United States Patent Office 3,453,071
Patented July 1, 1969

3,453,071
NITROGEN OXIDE CONVERSION
Karl Schmitt, Wilhelm Ester, and Hans Heumann, Herne, and Harry Pauling, Munich, Germany, assignors to Hibernia Chemie G.m.b.H., Gelsenkirchen-Buer, Germany, a corporation of Germany, and Harry Pauling, Munich, Germany
No Drawing. Filed May 16, 1966, Ser. No. 550,155
Claims priority, application Germany, May 18, 1965,
H 56,065
Int. Cl. C01b *21/24;* C01c *1/18*
U.S. Cl. 23—103                                29 Claims

---

ABSTRACT OF THE DISCLOSURE

Process for the absorption of the nitrogen oxide content of gases including adjusting the mol ratio of NO to $NO_2$ to 1 and then introducing this adjusted gas into an ammoniacal solution of ammonium nitrate. The disclosure further shows additional absorption using weak nitric acid-ammonium nitrate aqueous solution as the absorbent.

---

This invention relates to the recovery of nitrogen oxides from off gases containing such. It more particularly refers to the production of useful products from the nitrogen oxide content of off gases.

In the production of nitric acid and other nitrogenous products, there is generally produced an off gas or vent gas which contains significant quantities of nitrogen oxides particularly NO and $NO_2$. These represent a valuable material which is all too often vented to the atmosphere and thereby lost. In addition to the economic loss sustained by such venting, there is also an air pollution problem created thereby.

It has been considered desirable for a long time to recover the nitrogen oxide content of these off gases in order to improve the economics of such processes as produce these gases, as well as to prevent as much atmospheric contamination as possible.

In the past many processes have been suggested for the recovery of the nitrogen oxide content of off gases. For example, nitrogen oxide containing off gases have been absorbed in sulfuric acid to form nitrosyl sulfuric acid. Additionally, it has been proposed to absorb such nitrogen oxides in an alkaline medium such as soda or caustic. On a commercial basis, of the two above-recited processes, only the alkaline absorption has been even moderately successful.

It is apparent that it would be economically most desirable to recover the nitrogen oxide content of off gases as recited above in a form which would be more economically valuable. Ammonium nitrate represents such an economically valuable product and many proposals have been made in the past for conversion of nitrogen oxide off gases to the more desirable ammonium nitrate. It can be generally stated that some of these previous proposals have employed ammonia as the absorbent for the nitrogen oxides, whereby ammonium nitrate and ammonium nitrite are produced, which can be recovered by water absorption and washing. In other proposals, ammonium hydroxide (ammonia water) has been employed as the absorbent to produce directly an aqueous solution of ammonium nitrate and ammonium nitrite. Additionally, it has been proposed to use as an absorbent for gaseous nitrogen oxides ammonium salts of various weak acids such as organic acids or carbonic acid in the form of ammonium carbonates or ammonium bicarbonates.

In the prior art, it is known that ammonium nitrite can be converted to ammonium nitrate, e.g., by the sodium nitrite process by which nitric acid is added to ammonium nitrite solutions. It is also known that solutions of mixtures of ammonium nitrate and ammonium nitrite can be similarly converted to an ammonium nitrate solution.

The processes of the prior art which are based upon ammonia and ammonium compounds as the absorbent have not met with great commercial acceptance or success despite the fact that the suggested products of such processes are considered economically attractive. It is believed that this lack of acceptance is, to a great extent, due to the fact that there is an unusually high loss of available nitrogen, thereby rendering the processes less efficient than would be desirable. In addition, there is present in these processes a great danger of explosion which is the result of the autodecomposition of ammonium nitrite—one of the major products produced.

These above-referred-to drawbacks are well recognized in the art. Thus, for instance, in "Ullmann's Encyclopedia of Industrial Chemistry," 3rd edition, vol 3, page 611, Munich-Berlin (1953), paragraph 3, lines 2–5, it is stated:

". . . the alkaline final-gas absorption of the ammonia combustion with ammonia has not been able to get a foothold in industry, since, in addition to ammonium nitrate, there is also produced ammonium nitrite, the ease of decomposition of which results in losses of nitrogen and considerable dangers."

In Winnacker-Weingartner, "Chemische Technologie," vol. 2, Munich (1950), page 236, lines 4–10, it is stated:

"Methods have also been described in which ammonium nitrite is prepared by absorption of nitrous gases in ammonia water or in which alkaline absorption is effected directly with ammonia water. These methods have the disadvantage that in part ammonium nitrite which has been produced tends to decompose readily even at normal temperature. The yields are therefore low in these methods and the solutions obtained thereby are not without danger in the further processing, due to the ammonium nitrite contained in them."

In addition to the potential explosion problem and the generally high available nitrogen content loss, other problems have been encountered in the prior attempts to produce ammonium nitrate from nitrogen oxide-containing off gases. In practicing the prior art processes, a mist or fog of ammonium nitrite is produced which is at best difficulty absorbable in water. Therefore, potential product in the form of mist gets vented to the atmosphere with process waste gas, wherein it is either just lost or where it decomposes, sometimes explosively. Further, there are efficiency losses occasioned by the oxidation of recovered ammonium nitrite to ammonium nitrate which contribute economic deficiencies to the prior processes. Still further, the ammonium nitrate solutions which are recovered must be concentrated to a more usable nitrogen content, which concentration is sometimes quite expensive.

Attempts have been made to resolve some or all of the problems and inefficiencies of prior art processes using ammonia or ammonium compounds as absorbents for nitrogen oxide-containing gases. One such attempt has been to co-currently contact nitrogen oxide-containing gases with ammonia, oxygen and water vapor to produce a solution of ammonium nitrite and ammonium nitrate. This solution is combined with crude nitric acid, and the mixture is charged to an absorption column by a counter-current air stream, whereupon the product of the absorption column, nitric acid/ammonium nitrate solution, is recovered. One of the major disadvantages of this process is the fact that excess gaseous ammonia must, of necessity, be used, and this creates or enhances the great danger of ammonium nitrite decomposition. For this and other reasons, this process is not commercially acceptable and is not believed to be practiced industrially.

It is therefore an important object of this invention to provide a novel process for the recovery of nitrogen oxides from gases containing such.

It is another object of this invention to provide a process for producing ammonium nitrate from nitrogen oxides present in gaseous form.

It is a further object of this invention to provide an improved process, whereby gaseous nitrogen oxides are converted to ammonium nitrate in higher yields and with fewer losses than has been possible by prior art processes.

It is still another object of this invention to provide processes for conversion of gaseous nitrogen oxides to ammonium nitrate, wherein the prior art recognized danger of explosive decomposition of ammonium nitrite is substantially eliminated.

Other and additional objects of this invention will become apparent from a consideration of this entire specification including the claims appended hereto.

In accord with and fulfilling these objects, one aspect of this invention resides in the process of absorbing nitrogen oxide-containing gases into an aqueous ammoniacal solution of ammonium nitrate. In contradistinction to the prevailing view, it has now been found that it is readily possible not only to remove the nitrogen oxides completely from off gases, prevent the development of easily decomposable ammonium nitrite mists which are difficult to wash out and avoid the danger of explosions, but also to convert the nitrogen oxides in high yield into a strong ammoniacal ammonium nitrate solution by insuring that the degree of oxidation of the off gas nitrogen oxides being absorbed is such as to be equivalent to an $NO_2:NO$ mol ratio of about 1. This may be accomplished by adding NO or $NO_2$ to the gas being treated as desired in order to adjust the mol ratio of nitrogen oxides to the preferred level as above recited. This may also be accomplished by subjecting the nitrogen oxide off gas being treated to oxidation conditions or reduction conditions, whereby excess NO will be oxidized or excess $NO_2$ will be reduced, such that the desired mol ratio of about 1 is achieved. It is also within the spirit and scope of this invention to mix various off gases having varying proportions and ratios of NO and $NO_2$ so as to adjust the composite off gas to an $NO_2$ to NO mol ratio of 1. As can be readily appreciated, it may, in some cases, be practical to employ NO or $NO_2$-containing gases respectively rather than to utilize the pure nitrogen oxides. In any case and by whatever means are chosen as desirable in any particular circumstance, it is most important that the gaseous nitrogen oxides being fed to the process of this invention have a mol ratio of $NO_2$ to NO of about 1.

As has been pointed out above, the absorbent used in the practice of this invention is an ammoniacal aqueous solution of ammonium nitrate. It is preferred in the practice of this invention that this aqueous solution contain an ammonia content between certain limits in order for the process to operate most efficiently. One measure of the ammonia content of this solution is the ratio of water vapor to ammonia in the vapor space immediately above the solution. It is preferred to provide such concentrations of ammonia and ammonium nitrate that the weight ratio of water vapor to ammonia gas is about 2 to 1 to 100 to 1. It is important to control the ammonium nitrate content of the absorbent solution in such a manner that the solution viscosity at any given temperature is higher than the viscosity of water at that same temperature.

By utilizing a nitrogen oxide-containing gas having appropriate mol ratios as set forth and an absorbent fluid of ammoniacal ammonium nitrate preferably having an ammonia and an ammonium nitrate concentration as recited above, it is practical to operate the process of this invention. The formation of ammonium nitrite is preferred over the formation of ammonium nitrate upon absorption. It has been found that this is extremely desirable, since amomnnium nitrate has a relatively high heat of solution. This heat of solution is apparently great enough to initiate decomposition of ammonium nitrite, whereby efficiency losses and explosion dangers are incurred.

It has been found that, when the ammonia partial pressure above the absorbent solution is maintained at a level consistent with the parameters set forth above, at least half of the ammonium nitrite formation takes place at the liquid-vapor interface. This has been found to be a most desirable circumstance, since the heat of formation of the ammonium nitrite is dissipated such that this heat does not effect decomposition of ammonium nitrite in solution. The remainder of the ammonium nitrite produced by the process of this invention is formed in the gas phase by the successive absorption of small amounts of gaseous ammonia into the vapor space, where it is neutralized with water vapor and nitrogen oxide to form ammonium nitrates as well as the ammonium nitrites. The heat of neutralization of ammonia is therefore dissipatable in the vapor phase and does not concentrate sufficiently to effect the decomposition of ammonium nitrite. These small quantities of ammonium nitrates and nitrites formed dissolve in the absorbent solution and since the individual quantities are small, the heat of solution is insufficient to detrimentally affect the ammonium nitrite by decomposition thereof.

Where the ratio of water vapor to ammonia in the vapor phase above the absorbent solution is maintained low and preferably is at a minimum, the ammonium nitrite mist which is produced apparently is of a different character than that recognized by the prior art. As stated above, the ammonium nitrite mists produced by the prior art processes were recognized as insoluble or difficultly soluble in water and as readily decomposable. In contradistinction to this characterization, such ammonium nitrite mists as are formed according to this invention have at most an extremely slight tendency to decompose. In addition, the herein-produced ammonium nitrite mists seem to be quite readily absorbable in water to produce adequate aqueous solutions thereof. This mist is particularly absorbable in aqueous solution of ammonium nitrate quantitatively and rapidly, e.g., fractions of a second, so that substantially all of the prior art recognized deficiencies occasioned by ammonium nitrite mist production are substantially avoided.

As noted above, it is important in the practice of this invention to maintain the concentration of ammonium nitrate in the absorbent aqueous solution at a high level in order to avoid the tendency of ammonium nitrite to decompose. It is preferred in the practice of this invention to maintain this concentration at about 40 to 50 weight percent when operating the absorption process at about 20 to 30° C. It will be recognized by those skilled in the art that at ammonium nitrate concentrations in aqueous solution lower than about 30 weight percent, the viscosity of the solution is lower than that of water alone at the same temperature. The following table shows the relationship of viscosities of water and various concentrations of ammonium nitrate in water at 20° C. in centipoise:

| Weight-percent $NH_4NO_3$: | Viscosity |
| --- | --- |
| 0.0 | 1.005 |
| 10 | 0.96 |
| 20 | 0.97 |
| 30 | 1.00 |
| 40 | 1.10 |
| 50 | 1.33 |

It should be pointed out that decreasing the rate of flow of the absorbent through the absorption process of this invention does not act to improve the process, but rather impairs the absorption condition and impedes the efficient operation thereof.

It is preferred in the practice of this invention to operate in a continuous manner. It is also preferred to operate with a series of sequential absorption stages. This may be practiced by providing a series of individual and distinct absorber units. It is preferred, however, to utilize a simple absorber unit having multiple theoretical absorption stages or plates. These theoretical stages or plates can be calculated in the known fashion similar to that for distillation and/or rectification. The nitrogen oxide content of the off gases, being treated, converted and absorbed according to this invention, may vary from time to time in industrial operation, depending upon the source of the off gas and the load being placed upon the process from which the off gas is derived. Where such variances exist, it has been found practical to utilize two, three or more absorption stages. It is preferred to use at least three stages in most industrial installations in order to provide for adequate nitrogen oxide removal from off gases having widely varying content thereof.

In accord with another aspect of this invention, it has been found possible to effect an improvement in the general process of this invention by providing an internal recycle system for absorbent solution. This improvement manifests itself in two ways. In the first place, it is possible to maintain excellent control over the absorption temperature conditions by applying heating or cooling, as required, to this recycle stream. In most cases, it is required to remove heat from the absorption system and this may be readily accomplished by cooling the recycle ammonium nitrate solution. The second attribute of the use of an internal recycle of absorbent solution is the fact that this affords a particularly desirable point at which the ammonia required for this process can be added to the absorbent. It is within the spirit and scope of this invention to combine the temperature control feature and the ammonia addition feature attributable to use of the referred to recycle into a single operation; that is, a recycle stream of ammonium nitrate solution can be simultaneously cooled and have make up ammonia added thereto. Alternately, these ammonia addition and temperature control operations may be carried out sequentially. An additional consequence of practicing this aspect of this invention is the fact that the ammonium nitrate absorbent solution is stabilized by the ammonia addition and cooling with respect to the ammonium nitrate content thereof and against the decomposition of such ammonium nitrite. Further, the practice of this aspect of this invention can be credited with even further conditioning the character of the produced ammonium nitrate mists, such that said mists are an attribute rather than a detriment to the practice of this process.

In the prior art, it has been the practice that absorption processes of the type herein described are operated at low temperatures in order to avoid or at least minimize the already mentioned tendency of ammonium nitrite to thermally decompose, even with the addition of only moderate amounts of heat. The maximum temperature generally art-recognized as being even moderately safe for the practice of processes of this type is room temperature, i.e., about 20° C. It has been found that by the practice of this invention, including the above-recited safeguard parameters, this process can be operated at 30° C. or even higher without any appreciable attendant ammonium nitrite decomposition. By operating at higher temperatures, it is possible to practice this process more efficiently and thereby effect an improvement therein.

This process can be practiced to produce an absorber product having an ammonuim nitrite content of as high as about 0.5 to 5 weight percent thereby proving to be quite economical. Even further, high economies of operation can be achieved even with product having a 1 weight percent ammonium nitrite content when operating at relatively high temperatures while substantially avoiding the danger of explosive decomposition of ammonium nitrite.

It is another aspect and attribute of this invention to stabilize the product of the absorption process described herein against explosion. In addition to those aspects discussed above, this invention envisions the use of ammoniacal ammonium nitrate solutions having such a content of ammonia that, when considered in relation to the amount of nitrogen oxides being absorbed by this solution, there remains in the absorber product about 0.05 to 0.5 weight percent ammonia. The particular quantity of ammonia remaining in the product will be, to a great extent, determined, not only by the proportion of ammonia initially dissolved in the absorbent, but upon the temperature at which the absorption process is carried out. An added attribute is realized by maintaining the absorption parameters such that the specified ammonia content is present in the product. This attribute is the fact that by the presence of excess ammonia the absorber product is in better condition for further processing as is more fully explained hereinafter.

Most offgases contain at least some oxygen in addition to the nitrogen oxides referred to above. This oxygen tends to evolve in $NO_2$ a heat of reaction which is often sufficient to cause the thermal decomposition of ammonium nitrite. It has been found that an excess of ammonia in the absorption system tends to suppress this reaction and thus avoid the deterimental effects caused thereby. It is not desirable to use too large an excess of ammonia, since in the hereinafter described oxidation of ammonium nitrite to ammonium nitrate, the presence of ammonia may be detrimental, that is, in oxidizing ammonium nitrite to ammonium nitrate, nitric acid is used as the oxidizing agent. The neutralization reaction between ammonia and nitric acid to form ammonium nitrate proceeds more rapidly and preferably to the oxidation of ammonium nitrite to ammonium nitrate by the nitric acid. The neutralization reaction not only uses up nitric acid oxidizing agent, but further provides a heat input to the system by means of the heat of reaction. This heat can be sufficient to initiate thermal decomposition of ammonium nitrite which is, of course, to be avoided. Thus, this invention is best practiced by maintaining a small excess of ammonia in the absorption product, preferably within the limits set forth above.

It is still another aspect of this invention to provide an improved process, whereby off gases having widely differing nitrogen oxide contents and mol ratios can be processed through a given absorption system in an efficient manner. It sometimes happens that periodically, at regular or irregular intervals, additional nitrogen oxide containing gas becomes available for processing in addition to that gas which is regularly absorbed by the process of this invention. In this case, it has been found practical to process the normally available off gas by normal feed thereof to the first stage absorption, according to this invention, as above described. The additionally available off gas is preferably fed to a downstream absorption stage. Thus, the major quantity of nitrogen oxides are absorbed from the regular off gas in the first absorption stage with that portion of the regular off gas feed passing on to subsequent absorption stages containing a much reduced nitrogen oxide content. The additional off gas is fed to one of these subsequent absorption stages, thereby strongly increasing the concentration of nitrogen oxides in such stage, but, at the same time, not overloading the first absorption stage as would have been the case, had both the regular and the additional off gas been fed to the absorber first stage inlet.

It is therefore preferred in the practice of this invention to provide means in each absorption stage for the introduction of feed thereto and for the removal of product therefrom. Appropriate inlets should also be provided in each stage for feeding fresh absorbent solution thereto, should such be desired. Thus, off gas can be supplied to one or more stages and absorbent solution can be provided to one or more stages in an independent fashion as required in any given situation and the relationship of nitrogen oxides to absorbent solution can be individually controlled to meet the existent conditions.

It is within the spirit and scope of this invention to operate the absorber with co-current or counter-current flow of absorbent solution and nitrogen oxide gas. It is preferred in many cases to utilize co-current flow through the sequentially aligned absorber stages. As noted above, off gas and/or solution may be fed to one or more absorption stages, as desired, without changing the co- or counter-current character of flow through the absorber and without in any way altering the general direction of flow of gas, absorbent solution or absorbed solution product through the instant process.

Since, as noted above, the degree of oxidation of the nitrogen oxides charged to the instant process may change from time to time depending upon the source from which the off gas feed is obtained, and particularly depending upon the load being carried by the process producing this off gas feed, it is an aspect of this invention to alter, vary or adjust the nitrogen oxide content and mol ratio of the off gas being absorbed at one or more points in the absorption process. Where the off gas feed in constant insofar as its mol ratio and content of nitrogen oxides is concerned, it may be expedient to merely adjust the initial feed mol ratio to about 1 mol of $NO_2$ to 1 mol of NO. Where, however, the source is variant, it is preferred to feed additional NO or $NO_2$ as required to different absorption stages. Similarly, as with respect to the initial mol ratio adjustment set forth above, the NO or $NO_2$ may be supplied as pure streams or either may be supplied as gas containing such excess of the desired constituent as to balance the total gas mixture thus formed. Where subsequent gas content adjustment is provided, such is expeditiously accomplished after about one half to two thirds of the absorption stages have been utilized by the initial feed.

An additional variant in this aspect of this invention, that is, where the mol ratio of nitrogen oxides of off gas feed is adjusted during later stages of absorption, is to provide a mol ratio of $NO_2$ to NO greater than one. This can be accomplished where such $NO_2$ excess is provided at such stage of absorption that the greatest quantity of nitrogen oxides has already been absorbed leaving only minor or small quantities thereof left to be absorbed in the later absorption stages. Under these conditions, and provided all other preferred operating parameters, as noted above, are followed, the dangers discussed relative to the formation and dissolution of ammonium nitrate are substantially avoided and such dangers as may be present are of an insignificant nature and are readily compensated for, e.g., by cooling, raising ammonia content, etc.

It has been previously stated that the ammonia content of the solution product of the absorption process described herein is very helpful in stabilizing this solution product against thermal decomposition of the ammonium nitrite content thereof. It would be desirable to insure maintenance of such content of ammonia in such solution without having to continually or intermittently measure such, since instrumentation is costly and to a small extent detracts from the economics of a process. It has been discovered that it is possible to accomplish this desirable objective by modifying the absorption process of this invention only to an extent necessary to include an additional absorption stage before the last absorption stage normally incorporated in this process. This additional absorption stage does not utilize an ammoniacal ammonium nitrate aqueous solution absorbent, but rather uses a weakly acid aqueous solution of ammonium nitrate and nitric acid. This nitric acid-containing absorbent provides a ready supply of ammonia at all times to the extent that the ammonia content thereof is demanded. An interesting attribute of this aspect of this invention is that ammonia will automatically be supplied to the system, should an upset in operations occur, and thus, there is provided an automatic safety factor for bridging the time between any upset or process irregularity and the exercise of control to correct such problem.

Should it be considered desirable to provide and utilize an additional absorption stage provided with nitric acid/ ammonium nitrate solution absorbent, it is not desirable to employ the product of such stage or other discharges therefrom as a feed to the ammoniacal absorption stages without further processing. Such additional processing required is the neutralization of such discharge to an alkaline condition by the addition of ammonia thereto to convert the weak nitric acid constituent to ammonium nitrate. The thus treated efflux of the weak acid absorption stage may then be fed to the ammoniacal absorption stages alone or in admixture with fresh ammoniacal ammonium nitrate solution absorbent.

It is within the scope of this invention to further modify the process hereinabove described by the further inclusion therein of an additional absorption stage after the nitric acid absorption stage, as well as between the nitric acid absorption stage and the ammoniacal absorption stages respectively. Each of these further additional absorption stages is charged with water and the product thereof is fed to the ammoniacal absorption stages without first passing through the nitric acid absorption stage.

The first of these water absorption stages, that is the stage between the nitric acid absorption and the ammoniacal solution absorption, act as an ammonia buffer and scrubs ammonia out of the gases passing therethrough. Good instrumentation of this stage will permit an accurate evaluation of the ammonia content of the exhaust gas and will therefore permit control to be exercised over the process at least insofar as the ammonia content thereof is concerned. With this point of control and the data which can be obtained therefrom, it is possible to automate the process such that feed may be automatically proportioned.

Operation of this process in the manner described insures that the nitrogen oxide content of the off gases being treated are converted and absorbed predominantly as ammonium nitrite, thus substantially eliminating thermal decomposition thereof by reason of ammonium nitrate production and absorption, and possibly by means of ammonia neutralization.

This process, to be of high economic desirability, should be capable of producing ammonium nitrate as the final product with small or non-existent nitrogen loss via decomposition of the produced ammonium nitrite or non-absorption of part of the nitrogen oxide content of the off gas being treated.

As an adjunct to the absorption process described herein, there is provided a process for the oxidation of ammonium nitrite to ammonium nitrate in such a manner that ammonium nitrite content is not substantially lost through thermal decomposition thereof. In the past, it has generally been provided to add nitric acid of different concentrations to ammonium nitrite-containing solutions, and to use these solutions to convert ammonium nitrite to ammonium nitrate. It has now been found that, if the proportion of nitric acid/ammonium nitrate as compared to the ammonium nitrite content of the solution product is carefully controlled, ammonium nitrite can be safely converted to ammonium nitrate with a minimum of thermal decomposition and/or explosion hazard. This extremely desirable proportion of nitric acid/ammonium nitrate solution to ammonium nitrite contained in the absorber product is about 25 parts by weight of nitric acid solution per part of ammonium nitrite in the absorber product solution. It is advisable to utilize a nitric acid/ammonium nitrate oxidizing solution having such proportion of nitric acid with respect to the ammonium nitrite content of the absorber product that, upon completion of the oxidation step according to this invention, the residual nitric acid content of the product is not higher than about 3 weight percent. This residual nitric acid content is preferably about one half to one and one half percent.

In practicing the conversion of ammonium nitrite content of absorber product solution, using nitric acid as the converting agent, it has been found that some of the ammonium nitrate content of the conversion reaction medium decomposes under some conditions, particularly in the presence of nitrous acid or NO. It is believed that NO or also $HNO_2$ may be actually the cause of this decomposition or reduction of the ammonium nitrate to ammonium nitrite, since nitrous acid is known to proportionate to NO and nitric acid. The ammonium nitrite has a tendency to decompose to nitrogen, ammonia and water, thereby potentially severely hampering operation of this process and possibly reducing the yield of desired products therefrom.

It is therefore desirable to avoid this decomposition and reduction if at all possible. It has been discovered that the undesirable decomposition, etc., referred to above can be significantly reduced and in some cases entirely eliminated by the simple expedient of subjecting the nitric acid/ammonium nitrate/absorption product solution mixture to turbulence in any desired form so as to enable dissolved nitrogen oxides to vaporize and escape from the oxidation reaction medium, while causing a minimum of undesirable effects. This recommended turbulence can be accomplished by any one or more of several techniques, including agitation, spraying or blowing. In particular, a two-fold objective can be accomplished by blowing the oxidation reaction mixture with air or oxygen. In the first place, passing any gas through the reaction mixture tends to agitate it and permit dissolved nitrogen oxides to escape. An incidental adjunct will be the fact that the blowing gas will tend to strip the nitrogen oxides out of the reaction medium, thereby aiding in the removal thereof from potentially harmful contact with the desired product. Further advantage can be gained, however, by using an oxidizing gas as the blowing agent, whereby it is possible to obtain not only the advantages of agitating the oxidation reaction mixture, but also to aid in the oxidation of ammonium nitrite to ammonium nitrate and in the oxidation of nitrous acid to nitric acid.

Substantially any gas can be used for purposes of agitating the oxidation reaction mixture, according to the invention such as for example nitrogen or other inert gases or air, oxygen or other oxidizing gases.

An even better method of reducing the disadvantageous effects of nitrous acid and NO upon the desired reaction product, ammonium nitrate, is to continually circulate and cool the oxidizing solution of nitric acid and ammonium nitrate. It has been found that the mere circulation of the nitric acid/ammonium nitrate solution is effective to decompose undesirable nitrous acid to $N_2O_3$ and water. It has further been found that cooling of this oxidation reactive solution tends to prevent or inhibit the decomposition of ammonium nitrite and thereby maintains the generally high product yields available by the practice of this process.

As with many desirable process steps which are instituted for the purpose of correcting a problem which has arisen or which is anticipated, there are undesirable aspects of the cooling process discussed above as one solution to the problem of ammonium nitrite decomposition. Strong cooling not only prevents decomposition of ammonium nitrite, but it additionally tends to stabilize nitrous acid and also tends to inhibit or prevent the oxidation of this material to valuable nitric acid or to permit the decomposition of nitric acid to relatively harmless products. It has therefore been found desirable to maintain the temperature during conversion of ammonium nitrite to ammonium nitrate at between about 10° to 35° C. It is preferred to operate the nitric acid inversion step at about room temperature, e.g., 20 to 25° C., in order to permit this inversion to be carried out by the described method without the danger of loss of desired product or at least with this danger severely curtailed.

In accord with the practice of the process of this invention, it is possible to effect considerable savings in the amount of energy input to the process by reducing the amount of pumping required to transport solutions from one operation to another. It has been discovered that much of this movement can be accomplished by the use of gas lifts, that is, gas which is to be used in the process can be employed as the motive force to propel fluids from one operation to another. Thus, for example, it has been quite unexpectedly found that dissolved nitrogen oxides, particularly NO, which are produced in the nitric acid oxidation reaction step set forth above can be permitted to remain in solution, provided certain measures are taken to minimize or counteract the above-referred to deleterious effects usually accompanying the presence of such materials in said solution. In this regard, it has been found necessary to provide for large recycle systems, whereby a low conversion, of ammonium nitrite to ammonium nitrate, is taken per pass. Thus, an appropriate recycle stream is suggested to be about 250 parts by weight of solution per part by weight of ammonium nitrate in the absorber product. In addition, and particularly in view of the above recited desirability of using gas lift pumping, it has been found to be desirable to provide about one cubic meter of air (standard temperature and pressure conditions) to the system per kilogram of ammonium nitrite present in the absorber product being fed to the oxidizer. This air also serves the function of acting as an oxidizing agent, whereby the oxidative regeneration of nitric acid is accomplished or at least partially accomplished.

It is within the spirit and scope of this invention to provide oxygen instead of air where such is used. It is preferred to use oxygen in the same proportion as it would have been present, had air been used. It is also within the scope of this invention to use air enriched with oxygen, or oxygen mixed with inert gases in any proportions desired.

Nitrogen oxide gases produced during the oxidation of ammonium nitrite to ammonium nitrate may be recovered by absorption thereof in ammonium nitrate/nitric acid solution. In this case, it is particularly advantageous to utilize as the absorbent weakly acid nitric acid/ammonium nitrate solution such as that available from the acid absorption stage referred to above. This oxidation product may be used as the absorbent in the acid absorption stage set forth above. Put another way, weakly acid ammonium nitrate/nitric acid solution is used to absorb gaseous nitrogen oxide by-products of the ammonium nitrite oxidation process referred to above. The product of this absorption is oxidized and part of it, preferably as much of it as was initially fed to this absorption, is fed to the acid absorption stage set forth above. Thus, the acid absorbent used in this process is also produced in this process. Under some circumstances, it may be practical to internally manufacture all of the required weakly acid nitric acid/ammonium nitrate absorbent solution except for that amount required for start up of the process.

An additional use of this weakly acid ammonium nitrate/nitric acid solution is to neutralize it with ammonia, add additional ammonia and thus produce ammoniacal ammonium nitrate solution for use as the absorbent in the initial absorption stages referred to hereinbefore.

It is further practical, in some cases, to employ the final product of this process as the absorbent for the nitrogen oxide-containing off gases initially absorbed in the process of this invention. In this case, it is necessary to provide additional ammonia into the product of this process to produce the ammoniacal ammonium nitrate solution absorbent used in the initial nitrogen oxide absorption stages.

It is thus seen that it is possible to provide a process according to this invention which utilizes nitrogen oxide-containing off gases, ammonia, air, possibly water, and possibly some nitric acid as input constituents, while recovering ammonium nitrate product in good yield with good efficiency. The internally used component materials of this process can, at least partially, be manufactured by the process with only partial supplements being required.

The following examples illustrate the practice of this invention without in any way limiting the scope thereof. All parts and percentages expressed are in parts by weight, unless specified to the contrary.

EXAMPLE I

A gas composed of 95.7 volume percent nitrogen, 4 volume percent oxygen and 0.3 volume percent nitrogen oxides having a degree of oxidation of 60 percent, that is 60% $NO_2$ and 40% NO, was used as the off gas. This gas was fed, at a rate of 80 liters per hour through a nine stage absorber each of which stages was filled to capacity with a 0.1 percent b.w. aqueous ammonia solution. As the gas passed through the absorption stages, a dense white mist of suspended ammonium nitrite fog formed in each absorption stage. The removal of the nitrogen oxides from the feed gas was very insufficient.

EXAMPLE II

A nine stage absorption system was arranged similar to that described in Example I with each stage filled with absorbent soltuion the absorbent in this case was an aqueous solution of 30 percent b.w. ammonium nitrate and 0.1 percent b.w. amomnia. The same gas was passed through the absorber of this example as that used in Example I at the same rate. A white mist of ammonium nitrite formed in only the first two absorption stages and this mist was water absorbable. Nitrogen oxides were recovered from the feed gas to an extent of about 95 percent of that fed.

EXAMPLE III

Example II was rerun using as the absorbent an aqueous solution containing 50 percent b.w. ammonium nitrate and 0.1 percent b.w. ammonia. In this test no ammonium nitrite mist formed in any absorption stage and the removal of nitrogen oxides from the feed gas was greater than 98 percent.

Thus it can be seen that the practice of this invention makes it possible to:

(a) Substantially remove all nitrogen oxides contained in process off gas;

(b) Transform the removed nitrogen oxides into ammonium nitrite without danger and loss;

(c) Avoid the formation of non-recoverable ammonium nitrite mists as was usual in the prior art;

(d) Converting ammonium nitrite to ammonium nitrate in a convenient economical manner without danger and loss; and (e) Controlling all or portions of this described process automatically.

What is claimed is:

1. Process for absorption of the nitrogen oxide content of gases which comprises adjusting the mol ratio of NO to $NO_2$ in said gas to about 1 and introducing such gas into an ammoniacal ammonium nitrate aqueous solution at a temperature of about 20 to 30° C. and an ammonium nitrate content greater than 30 weight percent.

2. Process as claimed in claim 1, wherein said solution has an ammonia content such that the weight ratio of water vapor to gaseous ammonia over said solution is about 2 to 100 to 1.

3. Process as claimed in claim 1, wherein said solution has an ammonium nitrate content of about 40 to 50 weight percent.

4. Process as claimed in claim 1, wherein the viscosity of said solution is at least as great as the viscosity of water measured at the same temperature.

5. Process as claimed in claim 1, wherein said absorption is carried out in multiple stages.

6. Process as claimed in claim 5, wherein said absorbent solution is fed to each stage.

7. Process as claimed in claim 5, wherein additional nitrogen oxide-containing gas is fed to at least one absorption stage in addition to the first of said stages.

8. Process as claimed in claim 1, wherein an additional absorption is provided prior to the basic stage utilizing weakly acid nitric acid/ammonium nitrate solution as absorbent.

9. Process as claimed in claim 8, wherein one water absorption stage is provided between said ammoniacal solution absorption and said weakly acid solution absorptions and one water absorption stage is provided after said weakly acid solution absorptions.

10. Process as claimed in claim 1, wherein the product of said ammoniacal solution absorption is contacted with nitric acid whereby the ammonium nitrite content of said product is converted to ammonium nitrate.

11. Process as claimed in claim 1, wherein a recycle of a portion of the solution present in said absorption is accomplished and wherein ammonia is added to said recycle.

12. Process as claimed in claim 1, wherein said recycle stream is cooled.

13. Process as claimed in claim 1, wherein the product of said absorption contains about 0.05 to 0.5 weight per- ammonium nitrite.

14. Process as claimed in claim 1, wherein the product of said absorption contains about 0.05 to 0.5 weight percent uncombined ammonia.

15. Process as claimed in claim 1, wherein said absorption is undertaken co-currently.

16. Process as claimed in claim 5, wherein during said absorption the mole ratio of $NO_2$ to NO in unabsorbed gas is adjusted to exceed 1.

17. Process as claimed in claim 8, wherein the product of said weakly acid solution absorption is made alkaline by the addition of ammonia thereto and such alkaline solution is fed as absorbent to said ammoniacal absorption.

18. Process as claimed in claim 10, wherein said nitric acid is added as an ammonium nitrate-nitric acid solution and wherein about 25 parts of said solution are used per part of ammonium nitrite.

19. Process as claimed in claim 18, wherein said nitric acid is present in such proportion that the ammonium nitrate solution contains not more than about 3 weight percent nitric acid.

20. Process as claimed in claim 19, wherein said nitric acid is present in such proportion that the ammonium nitrate solution contains between about one half and one and one half weight percent nitric acid.

21. Process as claimed in claim 10, wherein said conversion reaction mass is subjected to agitation during conversion.

22. Process as claimed in claim 10, wherein said conversion reaction mass is sprayed during conversion.

23. Process as claimed in claim 21, wherein said agitation is affected by blowing an oxygen containing gas or an inert gas through said mass.

24. Process as claimed in claim 10, wherein at least part of the nitric acid/ammonium nitrate solution is recycled and cooled.

25. Process as claimed in claim 23, wherein said oxygen containing gas is utilized in a proportion equivalent to at least about 1 cubic meter of air measured at standard temperature and pressure per kilogram of ammonium nitrite and at least 250 kg. recycled nitric acid/ammonium nitrate solution.

26. Process as claimed in claim 10, wherein gaseous nitrogen oxides produced during the said conversion of ammonium nitrite to annonium nitrate are subjected to absorption into weakly acid nitric acid/ammonium nitrate aqueous solution.

27. Process as claimed in claim 26, wherein said absorption product is oxidized.

28. Process as claimed in claim 26, wherein a portion of the product of said weak acid absorption of produced nitrogen oxide gas is fed to a succeeding weak acid absorption means.

29. Process as claimed in claim 18, wherein said recycle is accomplished by gas lift.

References Cited
UNITED STATES PATENTS
| | | | |
|---|---|---|---|
| 1,070,070 | 8/1913 | Rothe | 23—104 |
| 2,110,431 | 3/1938 | Voogd | 23—103 |
| 2,805,123 | 9/1957 | Bostian | 23—104 |

OTHER REFERENCES
Kocierz et al.: Przemysl Chem. (1962), pp. 565–69.

OSCAR R. VERTIZ, *Primary Examiner.*

A. GREIF, *Assistant Examiner.*

U.S. Cl. X.R.

23—2, 104

UNITED STATES PATENT OFFICE
CERTIFICATE OF CORRECTION

Patent No. 3,453,071　　　　　　Dated　July 1, 1969

Inventor(s)　KARL SCHMITT, WILHELM ESTER, HANS HEUMANN and HARRY PAULING

It is certified that error appears in the above-identified patent and that said Letters Patent are hereby corrected as shown below:

Column 6, line 16, cancel "in $NO_2$"; column 9, lines 67 and 69, "inversion" should be --conversion--; column 12, line 18, "claim 1" should be --claim 12--; column 12, line 21, "0.05 to 0.5" should be --0.5 to 5--; column 13, line 1, "claim 18" should be --claim 11--

SIGNED AND SEALED
JUL 21 1970

Attest:

Edward M. Fletcher, Jr.
Attesting Officer

WILLIAM E. SCHUYLER, JR.
Commissioner of Patents